Oct. 5, 1954
H. M. PASSMAN
2,690,682
ANTIBACKLASH CONTROL SHAFT
Filed Jan. 22, 1953
2 Sheets-Sheet 1
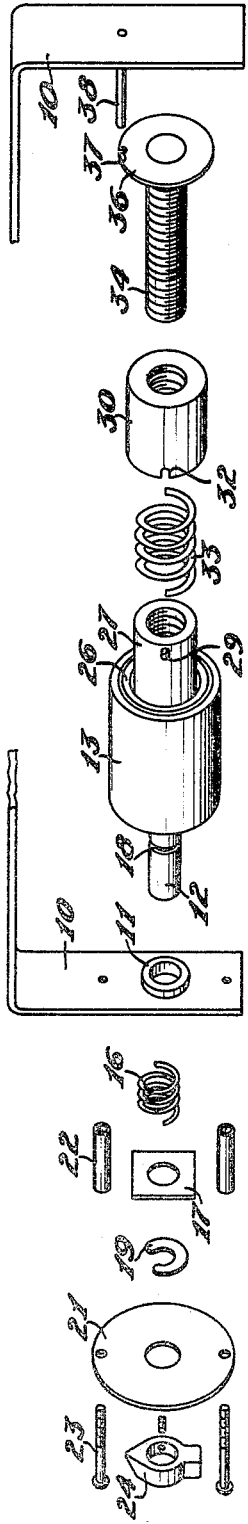
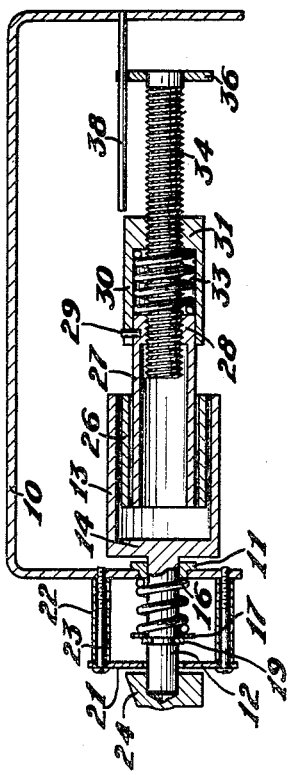
INVENTOR.
HARRY M. PASSMAN
BY
ATTORNEY Oct. 5, 1954　　　　　H. M. PASSMAN　　　　2,690,682
ANTIBACKLASH CONTROL SHAFT
Filed Jan. 22, 1953　　　　　　　　　　　　2 Sheets-Sheet 2

INVENTOR.
HARRY M. PASSMAN
BY
ATTORNEY

Patented Oct. 5, 1954

2,690,682

UNITED STATES PATENT OFFICE 2,690,682

ANTIBACKLASH CONTROL SHAFT

Harry M. Passman, Cedar Rapids, Iowa, assignor to Collins Radio Company, Cedar Rapids, Iowa, a corporation of Iowa Application January 22, 1953, Serial No. 332,720

5 Claims. (Cl. 74—441)

This invention relates to an anti-backlash device, and more particularly to a device for eliminating backlash between threaded members.

It is a general practice in the machine trade to undercut threads. This practice assures a fit between opposite threads but causes backlash. It is not feasible to machine threads to a precision that will eliminate all backlash. It is an object of this invention to eliminate backlash between threaded members and yet to allow free relative rotation between such members.

Where threads are specially cut to a very high precision to minimize backlash, slight temperature variations may undesirably affect their relative rotational movement. Contraction of the outer member may decrease backlash to the extent that there will be a large frictional force between members. Such friction may make relative rotational movement difficult, or even bind them. On the other hand, expansion of the outer sleeve may have an opposite effect and increase backlash.

It is another object of this invention to eliminate the effects of temperature change upon relative rotational movement or upon the amount of backlash.

Still another object of this invention is to provide a straight-line motion means which is immediately responsive to a rotary motion means.

Yet another object is to provide a means for preventing backlash due to wear between threaded members.

Yet another object is to provide a means for obtaining precise inductance adjustments of a slug-tuned coil.

A feature of this invention is found in the provision for a spring loaded cap and sleeve which are threadedly received on a shaft.

Figure 3:
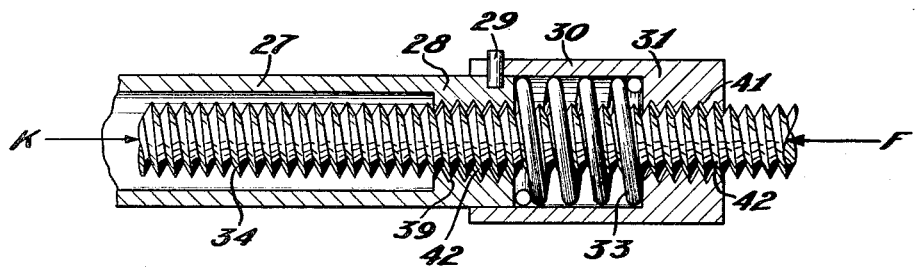
Figure 4:
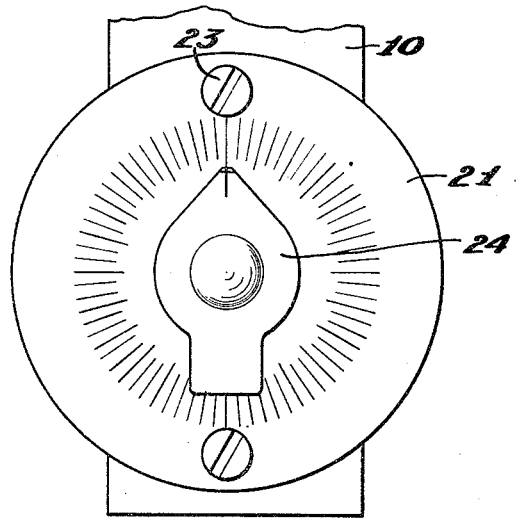

Other objects, features and advantages will become apparent from the following specification and drawings, in which:

Figure 1 is an exploded view of the invention;
Figure 2 is a cross sectional view of the device;
Figure 3 is an enlarged partial sectional view of the cap, threaded sleeve, spring and shaft; and
Figure 4 is a front view of the device.

When two mechanical parts are threadedly connected, there is usually a certain amount of movement or play between the mating parts because clearance between mating threads is necessary to avoid undue friction. This relative movement is called backlash. Oftentimes the coupling between the members becomes critical and backlash is a source of error. The present invention avoids such error by eliminating the backlash between the mating parts.

The assembled device is shown in cross section in Figure 2 and Figure 1 is an exploded view.

A frame 10 supports the device. A bearing 11 is inserted in a suitable hole in frame 10. (See Fig. 1.) Bearing 11 rotatably supports knob shaft 12 as shown in Figure 2. A radial groove 18 is formed in shaft 12.

A spring 16 is received on shaft 12 and abuts frame 10. A washer 17 is received over shaft 12 and abuts spring 16 at its other end. A horseshoe-shaped clip 19 is inserted in groove 18 to hold spring 16 compressed.

A hollow cylinder 13 is integrally formed with shaft 12. It has a larger outside diameter than shaft 12 and a shoulder 14 is formed where it joins shaft 12. The remaining portion of cylinder 13 is hollow and is open at its other end.

Stand-offs 22 support a dial plate 21 at a fixed distance from frame 10. The dial plate and stand-offs are attached by screws 23. Part of shaft 12 extends through a center hole formed in dial plate 21, and a knob 24 is mounted on its end. The front of dial plate 21 may have a suitable scale printed thereon to indicate the rotational position of knob 24. Figure 4 shows a front view of the knob 24 and dial plate 21.

A tube 26 is received inside of cylinder 13. Their right ends, relative to Figure 2, are fastened together. A sleeve 27 is internally received in tube 26. Their left ends, relative to Figure 2, are fastened together along their edges. A portion 28 at the other end of sleeve 27 is necked-down to a smaller inside diameter than the rest of sleeve 27 and is internally threaded.

A small pin 29 is fixed in the periphery of sleeve 27 above portion 28 and extends radially outward.

A hollow cap 30 is somewhat similar in shape to sleeve 27 but has a larger internal diameter so that it may be partially received over the sleeve 27. It is necked-down at one end to form an internally threaded portion 31. One end of cap 30 is formed with a rabbet 32 and pin 29 is received into the rabbet 32.

An externally threaded shaft 34 is threadedly received through portions 28 and 31 and a spring 33 is mounted therebetween and is in a compressed condition. A disc 36 is fixed on the external end of shaft 36 and has a notch 37 in its periphery.

A rod 38 has one end fixed to frame 10 and extends parallel to shaft 34 through notch 37 in disc 36. Rod 38 prevents rotational movement of disc 36 but will allow it to move longitudinally. Therefore shaft 34 cannot rotate relative to the frame but can move longitudinally.

The threads may be either right or left hand and right hand threads are illustrated to explain the operation of this invention.

If knob 24 is turned clockwise, disc 36 will move to the left. If it is turned counterclockwise, disc 36 will move to the right.

It is necessary that both springs 16 and 33 be under compression. Also it is essential that the magnitude of this compression force on each spring be greater than any force opposing the movement of disc 36. The reasons for this are explained below.

Figure 3 is an enlarged sectional view of portions 28 and 31, and includes the fragment of shaft 34 passing through them. Very loose fitting V-type threads are illustrated in Figure 3. This invention is not limited to V-type threads but may be used with any other type of threads.

The compression force of spring 33 always tends to force portions 28 and 31 apart. The threads 39 of portion 28 must then ride on the left side of the trough of threads 42 of shaft 34. (See Figure 3.) On the other hand, the threads 41 of portion 31 are forced to ride on the right side of the trough of threads 42 on shaft 34. It must be kept in mind that pin 29 which extends through rabbet 32 prevents any relative rotational movement between portions 38 and 31, but allows longitudinal movement.

If a force is exerted against one end of shaft 34, such as force F shown in Figure 3, there cannot be any movement of shaft 34 relative to portions 28 or 31 as long as force F is less than the compression force of spring 33. This can be explained by applying Newton's third law, where it will be seen that force F is transferred from shaft 34 to portion 31 through threads 42 which bears against the threads 41. The force F then is transferred by portion 31 to spring 33. As long as the compression force of spring 33 is greater than force F, the compression force is not overcome, and spring 33 will not compress any further and will remain a rigid body. It will exert a force equal to F against the portion 28 which in turn transmits the force to frame 10 through intermediate rigid members. The force F cannot directly bear on portion 28 because force F tends to move threads 42 away from threads 39.

If a resultant force K pushes against shaft 34 from the left relative to Figure 3, it will be transferred to portion 28. Portion 28 will transmit the force through intermediate rigid members to shaft 12. Shaft 12 will transmit it to clip 19 which will push against washer 17 which bears against spring 16. Spring 16 will transmit it to frame 10. Spring 16 will remain rigid while transmitting force K because its compression force is not overcome by force K.

There can therefore be no backlash between mating threads if springs 16 and 33 are compressed so that they exert a force greater than any applied force such as F or K.

If knob 24 is turned in either direction, portion 28 must likewise turn since all intermediate members are rigidly attached. The pin 29 will bear against the wall of rabbet 32 which will also cause cap 30 to rotate. The transverse fit between pin 29 and the walls of rabbet 32 should be snug so that there will be positive rotational response by cap 30 to the rotation of the knob 24. It is to be realized that the main purpose of cap 30 is to maintain tension on spring 33.

The fit between rod 38 and the transverse walls of notch 37 should be snug to prevent rotational play by disc 36.

Since there is no undesired play between moving parts in the device, it will be noted that the disc 36 will move longitudinally when knob 24 is rotated. It will also be noted that for any position of knob 24, there will be a corresponding longitudinal position of disc 36. The only remaining cause of error would be temperature variations. This is compensated in this invention.

An increase in temperature will have the following effects upon this invention. Let the face of bearing 11 which bears against shoulder 14 be taken as a reference point. The cylinder 13 will expand to the right in Figure 2 and carry the attached right end of tube 26 with it. At the same time, however, tube 26 will expand; and as its right end is moving to the right, its left end will move to the left and will take the left end of sleeve 27 with it. At the same time the sleeve 27 will expand; and as its attached left end moves to the left, its right end will move toward the right.

If the material of tube 26 is chosen so that it has a much higher coefficient of temperature expansion than that of the materials used for either the sleeve 27 or the cylinder 13, then portion 28 will remain fixed relative to bearing 11. It is to be realized, of course, that the lengths of the various tubes must be properly proportioned. If desired, the position of portion 28 can be made to shift slightly to the left in Figure 2 with increased temperature to compensate for the expansion of shaft 34.

Shaft 34 is made of a material with an extremely low coefficient of thermal expansion such as Invar.

Temperature changes will not cause backlash. (See Figure 3.) If portions 28 and 31 expand relative to shaft 34, spring 33 will move them apart which will prevent any backlash. If collar portions 28 and 31 should contract relative to shaft 31, they will move together and compress slightly spring 32. These changes in spring compression will be negligible, however. Therefore the frictional force between mating threads will remain substantially constant regardless of temperature changes and the rotational force required to move the knob will remain the same regardless of temperature change. This assures that there can be no freezing of threads or backlash.

Should wear occur between the threads, the spring will move portions 28 and 31 apart and automatically take up all backlash.

While I have shown and described a certain embodiment of my invention, it is to be understood that it is capable of many modifications. Changes, therefore, in the construction and arrangement may be made without departing from the spirit and scope of the invention as defined by the appended claims.

I claim:

1. An anti-backlash control shaft comprising, a frame member generally U-shaped, a knob shaft rotatably supported by said frame member, said knob shaft supported so that it will not move longitudinally relative to the frame member, a hollow cylinder connected to said knob shaft, a hollow tube mounted in said hollow cylinder with their outer ends connected together, a sleeve formed with a longitudinal opening mounted within said tube and with their inner ends connected together, said sleeve formed with an internal necked-down threaded portion, a hollow cap slidably received on said sleeve for longitudinal movement thereof, said cap formed with a necked-down internally threaded portion, means for preventing rotational movement between said cap and said sleeve, the control shaft threadedly received through the necked-down portions of said cap and said sleve, a spring mounted between said cap and said sleeve and held in compression, a rod attached to said frame, and a disc attached to one end of said shaft and formed with a groove through which said rod is slidably received.

2. Means for eliminating backlash on a control shaft comprising, a frame member, a knob shaft rotatably supported in said frame member, said knob shaft formed with a necked-down internally threaded portion, a cap formed with an internal opening large enough to receive one end of said knob shaft therein, means connected to said knob shaft to prevent said cap from rotating relative thereto by allowing it to move longitudinally, said cap formed with a necked-down internally threaded portion, the control shaft externally threaded and received through the necked-down portions of said knob shaft and said cap, a spring mounted between said necked-down portions of said cap and said knob shaft, end means fixed to said control shaft, and means attached to said frame member engageable with said end means for preventing said control shaft from rotating while allowing it to move longitudinally relative to the frame member.

3. A driving means for a control shaft comprising, a frame member, a knob shaft rotatably supported in said frame member, a hollow cylinder attached to one end of said knob shaft, a tube with a smaller external diameter than the internal diameter of said hollow cylinder received in said hollow cylinder and with one end attached to one end of said cylinder, a sleeve formed with a smaller external diameter than the internal diameter of said tube received within said tube and with one end attached to one end of said tube, said sleeve formed with a necked-down portion which is internally threaded, a cap formed with an axial opening with an inside diameter larger than the outside diameter of said sleeve and receivable over said sleeve for longitudinal motion relative thereto, means for preventing rotational motion between said sleeve and said cap, said cap formed with a necked-down threaded portion in alignment with the necked-down threaded portion of said sleeve, said control shaft externally threaded and threadedly received through the necked-down portions of said sleeve and said cap, a coil spring mounted about said control shaft between the sleeve and cap and held in compression, disc means fixed at an end of said control shaft, and means attached to said frame member engageable with said disc means for preventing said control shaft from rotating and to allow it to move longitudinally upon rotation of the knob shaft.

4. Apparatus for eliminating backlash comprising, a frame member, a first shaft rotatably supported in said frame member and held for non-longitudinal motion, said first shaft formed with a longitudinal opening and a necked-down portion which is internally threaded, a control shaft threadedly received through said necked-down portion, a cap formed with an axial opening received over said first shaft for longitudinal motion relative thereto and held against non-rotational motion, said cap formed with a second necked-down portion which is internally threaded and engageable with said control shaft, spring means mounted between said first and second necked-down portions and maintained under compression so as to tend to force them apart, means fixed to said control shaft, and means attached to said frame member engageable with said means fixed to the control shaft for preventing said control shaft from rotating when said first shaft is rotated.

5. A control shaft supporting means comprising, a frame member, a sleeve rotatably supported by said frame member but held against longitudinal motion relative thereto, said sleeve formed with a necked-down internally threaded portion, said control shaft externally threaded and receivable through said necked-down portion, a hollow cap receivable over said sleeve for longitudinal motion but held against rotational motion, said cap formed with a second necked-down portion through which said control shaft is threadedly received, a spring mounted between the end of said sleeve and said cap and maintained under compression, means fixed to said control shaft, and means attached to said frame member and engageable with said control shaft fixed means to prevent the control shaft from rotating while allowing it to move longitudinally.

References Cited in the file of this patent

UNITED STATES PATENTS

| Number | Name | Date |
|---|---|---|
| 2,607,826 | Barnes | Aug. 19, 1952 |